US010015072B2

(12) United States Patent
Cantwell et al.

(10) Patent No.: US 10,015,072 B2
(45) Date of Patent: Jul. 3, 2018

(54) CONSOLIDATION OF NETWORK TEST AUTOMATION TOOLS

(71) Applicant: NetScout Systems, Inc., Westford, MA (US)

(72) Inventors: Larry Cantwell, Moorestown, NJ (US); Steve Schmidt, Westampton, NJ (US); Flex Houvig, Wayne, PA (US); Bill Higgins, Medford, NJ (US)

(73) Assignee: NetScout Systems, Inc., Westford, MA (US)

(*) Notice: Subject to any disclaimer, the term of this patent is extended or adjusted under 35 U.S.C. 154(b) by 118 days.

(21) Appl. No.: 15/204,819

(22) Filed: Jul. 7, 2016

(65) Prior Publication Data

US 2018/0013657 A1    Jan. 11, 2018

(51) Int. Cl.
*H04L 12/26* (2006.01)

(52) U.S. Cl.
CPC ................... *H04L 43/50* (2013.01)

(58) Field of Classification Search
CPC ....................................................... H04L 43/50
See application file for complete search history.

(56) References Cited

U.S. PATENT DOCUMENTS

| 6,282,678 | B1* | 8/2001 | Snay | H04L 41/12 |
| | | | | 714/31 |
| 7,730,452 | B1* | 6/2010 | Li | G06F 9/443 |
| | | | | 717/124 |
| 7,840,664 | B2* | 11/2010 | Dugatkin | H04L 41/00 |
| | | | | 709/224 |
| 9,810,735 | B2* | 11/2017 | Kumar | G01R 31/3177 |
| 2014/0122928 | A1* | 5/2014 | Wang | G06F 11/263 |
| | | | | 714/27 |

* cited by examiner

*Primary Examiner* — Afshawn M Towfighi
(74) *Attorney, Agent, or Firm* — Locke Lord LLP; Scott D. Wofsy; Christopher J. Capelli

(57) ABSTRACT

An automated network test system includes an integrated network switch connected to a network under test. The network switch includes a first and second plurality of network switch ports. The network switch further includes a physical layer engine coupled to the first plurality of network switch ports. The network switch also includes at least one processor having a plurality of processing cores that can each asynchronously execute a test execution context and a test engine having a plurality of dynamically configurable function modules. The test engine is coupled to the second plurality of network switch ports, the physical layer engine and at least one processor. The test engine is configured for automatic testing of the network under test.

10 Claims, 3 Drawing Sheets

CONSOLIDATION OF NETWORK TEST AUTOMATION TOOLS

FIELD OF THE INVENTION

Embodiments of this invention relate to automated test tools, and particularly to consolidation of network test automation tools in a standalone device.

BACKGROUND OF THE INVENTION

Commercial and military systems today are largely software based and growing in complexity. However, despite advances in development practices and tools, the goals of accelerating the rate at which systems can be delivered and reducing their costs cannot be met by simply writing software faster. In testing environments for network hardware and software systems, it is generally accepted practice to automate as many test processes as possible in order to reduce time to market and increase efficiencies on capital assets. The key benefits of test automation include reduced time to market, the ability to share capital assets and the ability to reconfigure test resources over a shorter time window (seconds or minutes vs. days, etc.) often from remote locations.

Some common elements in test automation scenarios are Layer 1 switches, traffic generators, traffic analyzers and impairment tools. The challenge that exists with test automation today is that it requires deploying costly and complex specialized test equipment and requires operating many complex and diverse testing tools.

As a result, it is desired to implement a system for network test automation tools that can reduce complexity and effort of setting up a network test environment and reduce the overall cost of testing while at the same time facilitating the consolidation of test labs and test equipment thus enabling 24×7 automated testing across the globe.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, an automated network test system includes an integrated network switch connected to a network under test. The network switch includes a first and second plurality of network switch ports. The network switch further includes a physical layer engine coupled to the first plurality of network switch ports. The network switch also includes at least one processor having a plurality of processing cores that can each asynchronously execute a test execution context and a test engine having a plurality of dynamically configurable function modules. The test engine is coupled to the second plurality of network switch ports, the physical layer engine and at least one processor. The test engine is configured for automatic testing of the network under test.

In another aspect, a method for automated network testing by an integrated network switch connected to a network under test is provided. A request is received from a device connected to the integrated network switch. The request specifies one or more test suites to be executed. Internal image storage is searched, by a processor of the integrated network switch, to identify one or more configuration images associated with the one or more test suites to be executed. The one or more identified configuration images are loaded, by the processor of the integrated network switch, into a test tool engine of the integrated network switch. Network traffic data is generated, by the integrated network switch, based on the one or more test suites to be executed. The one or more test suites are executed to evaluate performance of the network under test using the test tool engine of the integrated network switch.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
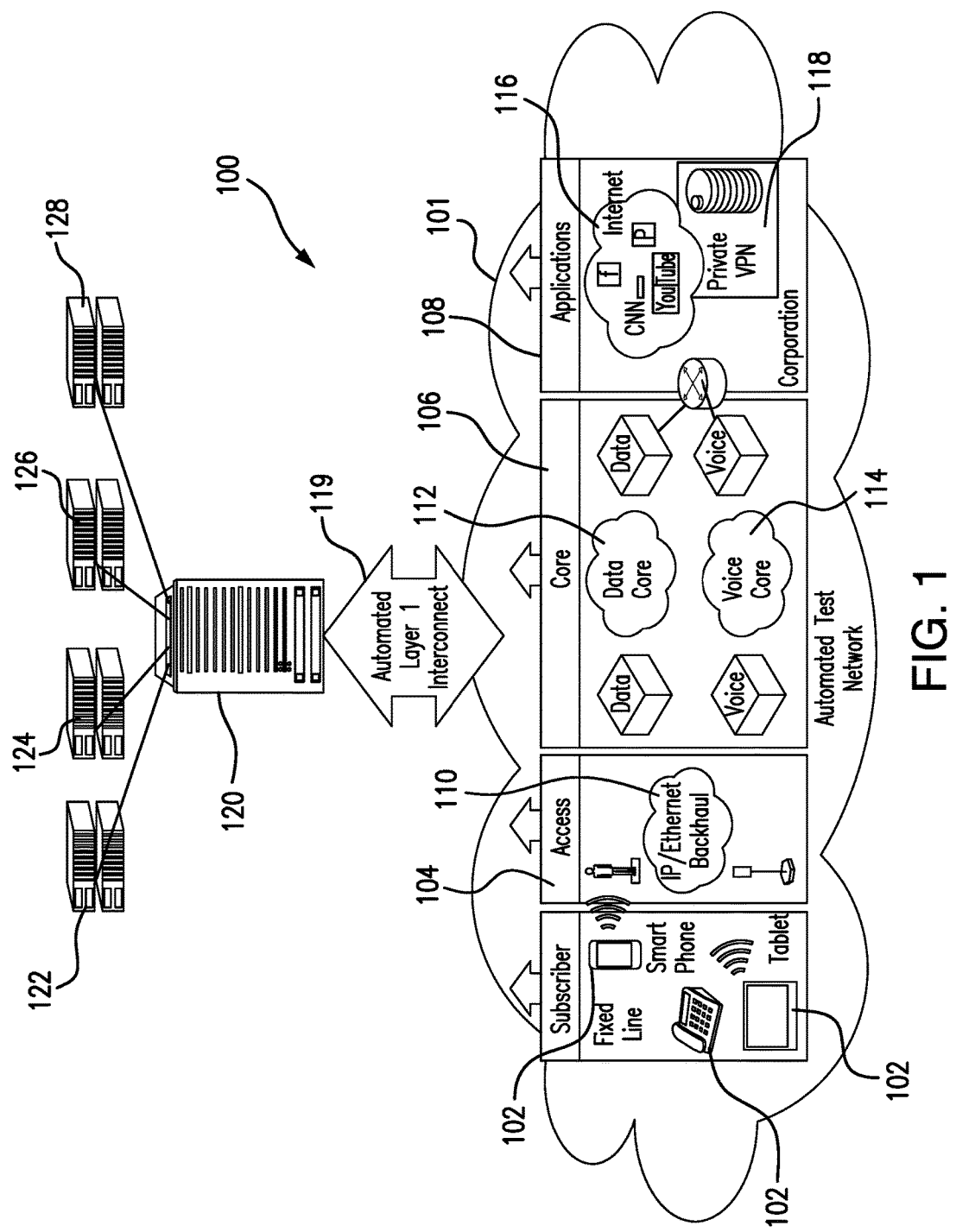
FIG. 1 is a schematic block diagram of a conventional automatic network test environment.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Test automation refers to the use of specialized test hardware and software systems that are driven by a test script to dynamically control the configuration and execution of the test on the network being tested as opposed to manually setting up and running each test case manually.

The existing test automation environment is typically deployed gradually over the course of time by deploying incremental hardware systems that perform the various automated test functions. Often time, budget constraints are deemed to become the limiting factor. The existing approaches have significant and costly problems. Scalability limitations of the prior art include restrictions on the type and level of functionality in a network test process. Furthermore, many of the diverse test tools require significant expertise in the relevant testing methodology.

One embodiment of the present invention provides an intelligent integrated switch that may be dynamically modified by external devices through soft-loadable modules. In this embodiment, the internal consolidated test automation tools add another layer to a single scalable layer 1 switching chassis based system. Particularly, various embodiments described herein provide a method and system for optimizing network testing in data centers and transformation of the switching functionality for consolidation with testing functionality. In one embodiment, the testing system includes a novel scalable test module consisting of a plurality of reconfigurable logic devices with firmware logic deployed thereon. The firmware logic is configured to perform a specified testing operation on the network data associated with the network under test.

Typically, some of the key problems in testing networks in general are identifying and describing which devices are required to be tested and which types of data are required to be collected, identifying where the required devices and data are located in a distributed network infrastructure and most importantly performing the testing steps, extracting and processing test results from multiple heterogeneous network data sources, while performing these steps on a recurring and ideally on a 24×7 automated basis. Advantageously, a plurality of internal re-configurable logic devices such as field programmable gate arrays (FPGA) are be used by the integrated switch to deploy a testing pipeline. These devices comprise means for enabling a diverse array of individual tests to be performed by a testing system on an automated basis. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In particular, embodiments of the present invention include an integrated testing system that comprises various hardware components running a number of software programs, usually remotely configurable. This reduces operational costs enormously and increases the usage and efficiency, compared to the traditional methodology where every configuration change is made at a particular hardware device. The disclosed testing infrastructure also greatly reduces the difficulty and costs of operator training, which in the traditional methodology is expensive, considering that the testing infrastructure may include many complex and diverse testing tools. Further, the disclosed testing infrastructure also enables embedded power/environmental/security monitoring and management capabilities at the rack level, where they can best be used to gather data that can be used to assemble a very detailed and coherent picture of what is really happening in the network under test.

In FIG. 1, a representative conventional automatic network test environment is shown and generally designated 100. While certain connections and/or devices are shown in FIG. 1, in practice, additional, fewer, or different, connections or devices may be used. Further, a particular network may include multiple networks. In some embodiments, the testing infrastructure 100 can reach thousands of devices, including the network devices under test as well as test automation tools 122-128.

A "network under test" may refer to a number of computers and associated devices that may be connected by communication facilities. A network under test (referred to hereinafter simply as a "network") may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 702.x, etc.

The network test computing environment 100 may be used to prepare a desired test configuration for the network 101. The test environment 100 uses the desired test configurations to automatically determine the limits of the network 101 and its elements 102-118. A plurality of desired test configurations may be defined externally from the test environment 100. The test environment 100 may be used for carrying out one or more tests on the network, device or system under test.

In modern networks, typically, the level of availability is defined in a customer service agreement, where the service provider agrees to maintain the availability at the specified level. For example, in such an agreement, five-9 availability or 99.999% availability is defined as the level of availability to be provided by communication service providers. The test environment 100 can test the performance of the network 101 and/or performance of various hardware and software resources 102-118 utilized by the network 101 using one or more test cases. The test cases correspond to different software configurations (such as different platform version and product version configurations) and may be executed at substantially overlapping time(s), which is to say in "parallel." Accordingly, the automated test tools 122-128 are configured frequently, often many times per day, so that the testing equipment takes on the same high availability characteristics as the network equipment under test 102-118.

In FIG. 1, the network 101 includes a plurality of hardware devices and applications that are under test. FIG. 1 is an exemplary and non-limiting diagram of a network test infrastructure 100. As shown in FIG. 1, this test environment includes a user device 102, an access network 104, a core network 106, a plurality of applications 108 accessible via the Internet 116, and a private network 118. User device 102 provides a user with mobile communications capabilities. Accordingly, user device 102 may be a fixed line telephone, a mobile telephone, a smartphone, a wireless personal digital assistant (PDA), a mobile internet device (MID), a notebook computer, a tablet computer, a nettop, a wearable computing device, a smart TV, and the like. Mobile communications of user devices 102 are facilitated through one or more access networks 104. In one example, the access network 104 may further include one or more large IP backhaul networks, such as Ethernet backhaul 110. In other examples, the access network 104 may be a wireless network, such as an Institute of Electrical and Electronics Engineers (IEEE) 802.16e WiMAX network. However, other network types may be employed. Examples of such other network types include (but are not limited to) IEEE 802.16m networks, and IEEE 802.11 wireless local area networks (WLANs).

The core network 106 may make various services available to user devices 102. For instance, the core network 106 may provide user devices 102 with access to services provided on networks (also referred to as access points), such as the Internet 116 and the private network 118. Exemplary services include (but are not limited to) Voice over Internet Protocol (VoIP) telephony, messaging, web browsing, content (e.g., video and/or audio) delivery, interactive gaming, and so forth. As shown in FIG. 1, the core network 106 may include a voice core 114 (for providing VoIP and other audio delivery services) and a data core 112 for delivering other packet-based traffic. Both the data core 112 and the voice core 114 may include one or more elements implemented in any combination of hardware and/or software.

The testing infrastructure 101 may further include a physical layer switch device 120 connected to the network 101 via a high speed automated interconnection link 119 and a plurality of testing tools 122-128 communicatively coupled to the physical layer switch device 120. The physical layer switch device 120 enables the remote reconfiguration of the test network on the fly. In one example, the testing tools may include one or more test data generator 122, one or more impairment tools 124, one or more data analysis tools 126 and one or more application simulators 128.

The test data generator 122 will provide network test data to the physical layer switch device 120. In one example, the test data generator 122 may be adapted to generate session initiation protocol (SIP) traffic. Such SIP traffic may simulate high volumes of "calls" into the core of a telecommunications system, for the purpose of stressing the system in order to expose any marginal elements. Exemplary SIP call traffic may include "stateful" IP packets for setting up a "call", potentially followed by RTP "media" traffic, followed by call teardown "stateful" IP packets. The RTP traffic could consist of voice data digitized or compressed with a codec, such as G711, G729, or AMR-WB. These media streams would be injected into the systems under test, such as the data core 112 and the voice core 114 and the results can be monitored by the test data generator 122. Such results would show the ability of the system-under-test to accept and process high levels of traffic, providing assurance that the overall system is robust and reliable. If certain components of the system-under-test cannot handle the described traffic levels, this type of testing can expose those components so that they may be upgraded or replaced with more reliable components.

Conventional benchmarking methodologies typically rely on test conditions with constant packet sizes. While these tests with a constant packet size reveal device capabilities, they differ significantly from the conditions encountered in operational deployment. To address such differences, in another example, the test data generator 122 may generate a typical Internet packet mix, the so called IMIX that simulates real-world packet distributions. The mixture of packet sizes each networking device will encounter is highly variable and depends on many factors. Further, an IMIX suited for one networking device and deployment will not be appropriate for another. Hence, script-based IMIX testing can provide valuable insight into the ability of a system-under-test to handle this "normal" type of Internet traffic.

As yet another example, the test data generator 122 may generate traffic with accumulated jitter. For example, PRBS (pseudo-random binary sequence) pattern can be generated specifically to stress the channel receiver's ability to recover the traffic without error. Another type of traffic pattern that can test data-dependent jitter is the IEEE 802.3ae compliant Continuous Jitter test pattern (CJpat), which is designed to exercise clock recovery circuits.

The impairment tool 124 is configured to generate and inject impairments into the network testing system 100. Throughout this description the term impairment will be used to indicate any type of abnormal operation which may be injected into the testing system to determine the network's response to the abnormal operation. In one example, such impairments can be packet impairments, e.g., TCP packet impairments. Thus, the impairments that may be used in conjunction with the network test computing environment 100 are not limited to any specific type of impairments. Those of skill in the art will understand that there are numerous types of impairments that may be used.

The application simulator 128 is configured to simulate one or more applications in the network testing system 100. As used herein, the term "simulation" is used to mean any of a variety of tools available to emulate the functionality of a network application based on a model of the network and a model of the traffic being passed over the network. Such simulation tools may include, for example, discrete event simulators that model each transmission of packets from network nodes. Additionally, the application simulator 128 may be used to simulate the performance of an application by actually generating messages and packets based on a model of the traffic that an application is expected to generate in use, and collecting performance statistics based on these generated test messages and packets.

During testing, test scenarios are run using exemplary software application simulators 128. Trace data including network response and load information is collected during the test scenarios. The trace data is used as input data into various network data analysis tools 126. The network analysis tools 126 evaluate the computer network's response using a variety of criteria. For example, the network analysis tools 126 may search for errors in data streams to help diagnose various network issues uncovered in the test environment 100.

Integrating all of the physical and non-physical elements of a given network test environment creates many further complexities, from the design and development of the various test scripts through deployment, configuration and maintenance of the complete set of test tools 122-128. Unfortunately, as described above, it has traditionally been difficult to find cohesive, methodical automated assistance in implementing the various tasks associated with comprehensive network testing. Such testing infrastructure inevitably increases both the capital expenditure (CAPEX) and operational expenditure (OPEX) significantly. Advantageously, various embodiments of the present invention consolidate the above described automated test tools 122-128 into the physical layer switch device 120 in order to reduce both the CAPEX and OPEX expenditures.

Figure 2:
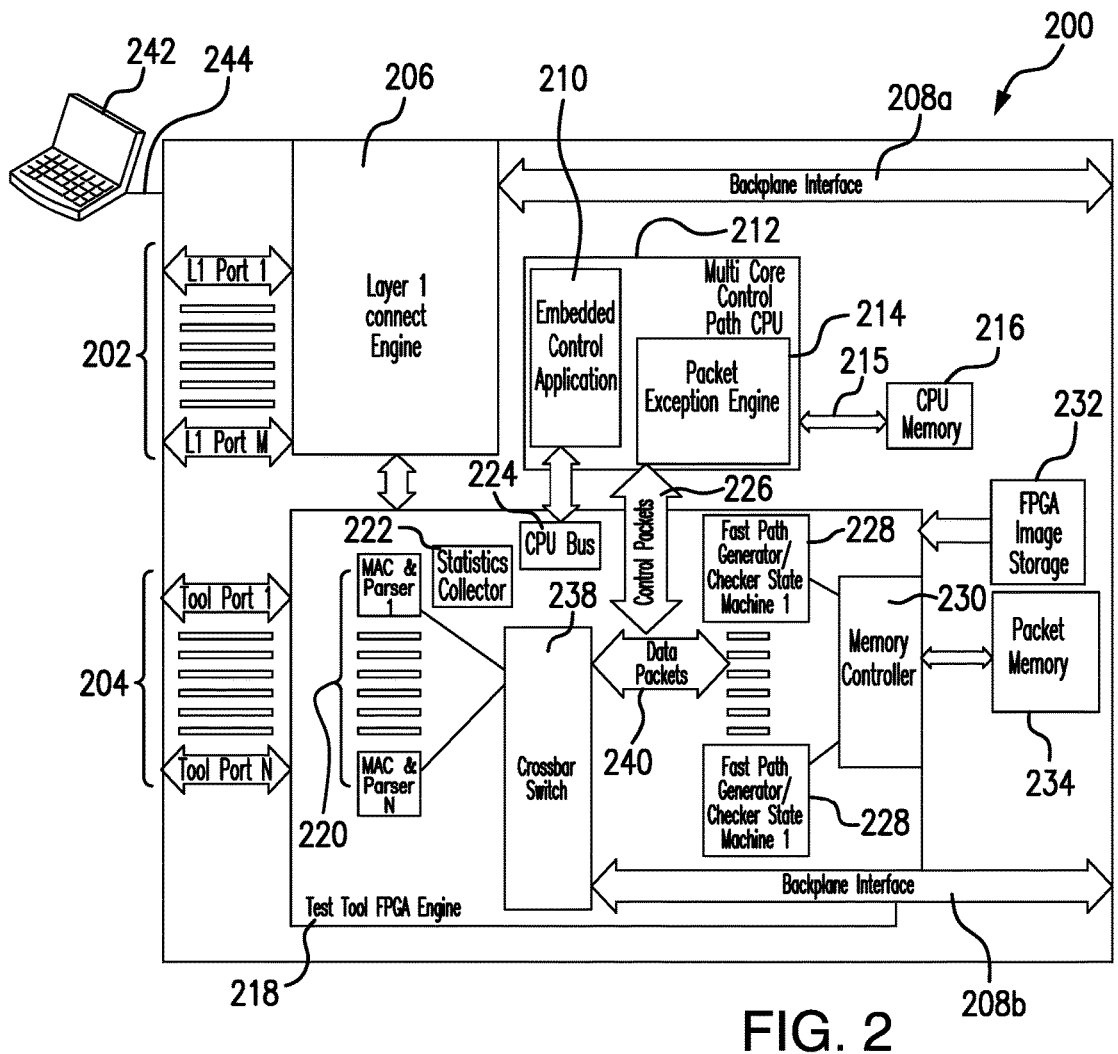
FIG. 2 is diagrammatical view of an integrated test automation network switching blade and bus structure according to an embodiment of the present invention.

FIG. 2 is diagrammatical view of an integrated test automation network switching blade and bus structure according to an embodiment of the present invention. An integrated testing framework 200 and corresponding methodology creates and coordinates interactions between the switching circuitry, testing tools, test cases, and their respective methods that typically span multiple devices across multiple network locations. The integrated framework 200 further automates and not only increases the reliability and efficiency of many tests, but also prevents flaws, errors and miscommunication. The integrated testing framework 200 has a plurality of components described below. Advantageously, the testing framework 200 automates and coordinates the interaction of all the necessary resources to execute continuous regression test scripts, potentially around the clock, on the test networks, such as the network 101 shown in FIG. 1. As described below, automation also enables testing different features of hardware devices, such as network switches and network routers, at their upper limits to find out specific weaknesses in the design of these devices. To optimize turn-around time, the automated testing framework 200 is adapted to share test equipment between test engineers around the clock in a "follow the sun approach", since testers can remotely reconfigure and start/stop test job programs and/or change test configurations essentially any time regardless of where the actual hardware resides. As discussed in greater detail below, a plurality of desired test configurations may be defined externally from the test environment 200, stored within the test environment 200 and selectively loaded for carrying out one or more tests on the network, device or system under test.

In the embodiment illustrated in FIG. 2, the backplane of the intelligent physical layer switch device 200 may include a first plurality of ports 202 and a second plurality of ports 204. In one embodiment, the first plurality of ports may comprise low latency L1 ports while the second plurality comprises smart ports. As used herein the term "smart port" refers to a switch port that functions not only as a layer 1 port but can also perform advanced layer 2 through layer 7 functions. These functions include traffic generation and impairment as some examples. It should be noted that the intelligent physical layer switch device 200 can easily be adapted to various modes of operation. In one embodiment, modes of operation may include "layer 1" mode, "smart" mode and "stats" mode. According to this embodiment, when the intelligent physical layer switch device 200 operates in "layer 1" mode, both the first plurality of ports 202 and the second plurality of ports 204 may function as low latency L1 ports. On the other hand, when the intelligent physical layer switch device 200 operates in "smart" mode, both the first plurality of ports 202 may function as low latency L1 ports, while the second plurality of ports 204 may function as smart ports. In one embodiment, the first plurality of ports 202 may include approximately 72 ports having latency less than about 5 ns and the second plurality of ports 204 may include approximately 24 ports having latency ranging between approximately 500 ns and approximately 1000 ns.

In one embodiment, the first plurality of ports 202 may be connected to the layer 1 connect engine 206. In this embodiment the connect engine 206 may comprise a non-blocking crosspoint switch fabric. The connect engine 206 of the intelligent physical layer switch device 200 may further include an external interface component (not shown in FIG. 2) consisting of various interfaces such as, but not limited to, QSFP (Quad Small Form-factor Pluggable) fiber interfaces, CDR (Clock Data Recovery) interfaces, a RS232 console interface and a plurality of LEDs. It should be noted that both the first plurality of ports 202 and the second plurality of ports 204 may be communicatively coupled to QSFP interfaces, for example. In one embodiment, the external interface may be capable of receiving and transmitting non-multiplexed or demultiplexed network traffic (sometimes referred to as "low-speed" traffic, which typically include relatively lower-speed communications, such as 10 G or 40 G). In one embodiment, the CDR interfaces may be capable of adjusting primary data rates between approximately 1.25 MHz/s and approximately 15 Gb/s depending on the reference clock being used by the intelligent physical layer switch device 200. In one embodiment, the RS232 console interface may be implemented as RJ-45 port. It should be noted that each of the first plurality of ports 202 and each of the second plurality of ports 204 may be associated with a corresponding LED to indicate beaconing, connection made or fault state.

According to an embodiment of the present invention, the connect engine 206 may also include backplane CDR circuits for a backplane interface 208. The backplane interface 208 may have a plurality of traffic flow paths.

The intelligent physical layer switch device 200 utilizes a multiple processor core device 212 having shareable functional units, according to the preferred embodiment of the present invention. Physically, processors are implemented as multiple processor core devices 210 and 214. In the preferred embodiment, each multiple processor core device 212 is a monolithic integrated circuit chip containing multiple processors 212, 214, also referred to as processor cores.

Each processor 210, 214 executes instructions stored in CPU memory 216, and may include one or more levels of cache, some of which may be shared with another processor or processors on the same chip. The CPU memory 216 is a random-access semiconductor memory for storing data and programs. The CPU memory 216 is conceptually a single monolithic entity, it being understood that memory is often a more complex arrangement, such as a hierarchy of caches and other memory devices. A memory bus 215 provides a data communication path for transferring data among CPUs 210, 214 and the CPU memory 216.

According to an embodiment of the present invention, one of the processors may comprise an embedded controller 210 running one or more configurable control applications. As shown in FIG. 2, the embedded controller 210 is coupled with a test engine 218 running various software modules customized for a desired test control application. In one example, the embedded controller 210 may be adapted to control insertion of test data units into the switch fabric 206, control the switch fabric 206 to perform tests with the inserted test data. The embedded controller 210 may be adapted to control operation of other software modules hosted by the test engine 218, such as but not limited to, modules configured to analyze the test data units in the switch fabric 206 after the completion of one or more test scripts configured to output test results relating to the analysis of the test data.

In some embodiments, each core 210, 214 is assigned at most, one execution context. Each execution context may then asynchronously run on its assigned core. If execution context is blocked, then its dedicated core may be suspended or powered down until the execution context resumes operation. The embedded controller 210 remains dedicated to a particular execution context, and thus, avoid the costly operations of a process or context switch, such as swapping register content.

In one embodiment, the embedded controller 210 operates as a master FPGA interface. The master FPGA interface provides a system-level microprocessor interface to the FPGA user-defined logic. The embedded elements on the embedded controller 210 and test engine 218 may be thought of as master or slave devices, a master being in control of the traffic on the embedded CPU bus 224 and a slave being a respondent to a request from the master. In the given embodiments, the embedded controller 210 is designated as a master device, and has the highest priority with respect to other engine elements in arbitration for access to the embedded CPU bus 224. Examples of embedded controller's 210 elements may include, e.g., a configuration interface to the FPGA configuration logic.

Furthermore, the embedded controller 210 may be part of packet processing architecture, where the embedded controller 210 comprises one of embedded processor cores for executing program instructions associated with packet processing. However, in this embodiment, the embedded controller 210 only processes so called "non-exception" packets, such as certain data packets. Upon determining a packet is an "exception" packet, that packet is forwarded by the embedded controller 210 to a packet exception engine processor 214 dedicated for processing "exception" packets, such as certain control packets 226, configuration packets, etc. This multi-core packet processing architecture of the intelligent physical layer switch device 200 increases throughput, efficiency, is scalable with two or more processing cores, and reduces the amount of code base required for packet processing. For example, in a typical "slow path" architecture, which has a set of one or more processing cores being dedicated for processing only "exception" packets, those processing cores are idle when not processing "exception" packets. By way of example, in previous multi-core processing architectures, if the multi-core processor has two processing cores, one being dedicated for processing "exception" packets and the other being dedicated for processing "non-exception" packets, it should be understood that the processing core dedicated for processing "exception" packets remains idle most of the time ("exception" packets are encountered much less frequently than "non-exception" packets). In contrast, embodiments of the present invention include one or more packet exception processing cores 214 capable of processing "exception" packets and "non-exception" packets (e.g., all packets), and one or more embedded controller processing cores 210 capable of processing "non-exception" packets (e.g., the majority of packets). Thus, embodiments of the present invention reduce the amount of time any of the processing cores 210, 214 of a multi-core processor are idle, which increases packet processing throughput and efficiency.

High-speed high-density logic circuits, like FPGAs, along with scalable embedded CPUs and the accompanying software and APIs described below comprise enabling building blocks of various embodiments of the present invention. These features enable the development of a scalable intelligent physical layer switch device that houses the unique capability to monitor, impair and generate live network test data in real time at the click of the button, as test data passes through the intelligent physical layer switch device. Advantageously, this network testing infrastructure not only enables significant CAPEX and OPEX savings, but also enables the flexibility to scale test capabilities as network devices and network applications evolve over time. In various embodiments, a suitable configuration of software modules may be utilized for network testing by a software eco-system by loading a plurality of user-selected pre-configured candidate software modules (e.g., FPGA images) into separate processing devices, executing each software module (at least some of them in parallel) and analyzing results of the testing. This approach significantly simplifies the test automation setup, while, at the same time, providing capital investment protection.

As shown in FIG. 2, the intelligent physical layer switch device 200 includes a test engine 218 having a plurality of dynamically configurable function modules. The test engine 218 is coupled to the second plurality of ports 204, the connect engine 206 and the multiple processor core device 212 having shareable functional units. The test engine 218 is configured for automatic testing of the network 101.

In one embodiment, the test engine 218 includes a configurable packet header parser 220, which may be a reconfigurable packet header parser comprising a software-based or an FPGA-based state machine, which may potentially be reconfigured, for example re-programmed, to accommodate new headers and/or new port numbers. Such re-programming is generally not possible for conventional high-data-rate packet header parsers based on hard-coded state machines, such as those implemented using an ASIC. The packet header parser 220 may include a plurality of monitoring probes.

Further, the test engine 218 is enabled to collect statistics (e.g., packet counts, byte counts, error counts, utilization, etc.) at least on a subset of the first plurality of ports 202 and/or a subset of the second plurality of ports 204. In one embodiment, the test engine 218 may include a statistics collector 222 adapted to receive a packet from the packet header parser 220 and determine, based on the packet, what type of event is occurring. Exemplary event information may include whether the packet is enqueued, dequeued, dropped, includes an error, etc. Other event information may include packet size (e.g., in bytes). This way, the statistics collector 222 may track, for example, how many bytes have been enqueued, dequeued, dropped, etc. from a particular source. Upon receipt and processing of a packet, the statistics collector 222 may update the appropriate count(s), which may be stored, for example in the CPU memory 216.

It should be noted that it might be desirable to users of the intelligent physical layer switch device 200 to know how utilized the testing infrastructure is over the course of time, to optimize its utilization. According to an embodiment of the present invention, when the switch 200 operates in either "smart" mode or "stats" mode, the statistics collector 222 may be enabled to provide statistics on one or more group of ports. Each group may include, for example between 1 and 12 ports. In this embodiment, users may set up these groups from a remote device, such as device 242 shown in FIG. 2. Furthermore, as part of this setup process, users may configure a sampling period. The packet header parser 220 may monitor one port in each group at a time and may move to the next port in each group upon expiration of the sampling period. In some embodiments, individual groups of ports may have different sampling periods. It should be noted that, the statistics collector 222 is capable of generating infrastructure utilization graphs associated with relatively long periods of time.

The switch fabric of the connect engine 206 may be coupled to one or more crossbar units 238 residing within the tool engine 218, where each of the crossbar units 218 includes input ports and output ports and where each of the crossbar units 218 implements a non-blocking switch in which a data unit received at any of the input ports can be multicasted to any number of the output ports. The connect engine 206 and the crossbar unit 218 share a plurality of ports to provide cross connections between them. In one embodiment, the number of shared ports may be equal to 16. According to an embodiment of the present invention, at least some of this plurality of shared ports can be dedicated to gathering port statistics when the switch 200 operates in either "smart" mode or "stats" mode. By using the crossbar switch unit 238, the tool engine 218 is capable of parallel data communication, so that system performance can be improved by transferring data at high speed without data transfer delay. Furthermore, the matrix-form crossbar switch architecture of this embodiment has the advantage of being very easily expanded.

According to an embodiment of the present invention, the intelligent physical layer switch device 200 further includes a packet memory management unit. The packet memory management unit has a packet generator 228, a memory controller 230, and a packet memory 234.

The packet generator 228 may comprise a fast path traffic generator capable of generating IP, UDP and TCP traffic. In other words, the packet generator 228 makes use of a FastPath Application Programming Interface (API) known in the art that extracts the best performance from multi-core architecture. It should be noted that like other components of the tool engine 218, the packet generator 228 is pre-configured for a specific set of tests, where the user first defines a 'template' that specifies a network packet: for each layer of the OSI model the networking protocol to be used and the contents of useful fields are provided. Then, a traffic pattern is defined as one or several 'streams', specifying transmission and reception ports, the template to be used and optionally 'attributes' that alter fields in the template, for example to change the destination IP address for each generated packet. Finally, traffic generation is started by the packet generator 228, specifying the streams to use, the maximum traffic rate, max number of iterations, duration of each iteration, and the like.

The memory controller 230 controls the read and write (or load) operations from and to the packet memory 234, and controls the overall packet memory 234 to deliver the generated packets in a fixed transmission order. The packet memory 234 may be physically partitioned into a plurality of memory blocks and logically partitioned into a plurality of buffers. For example, the memory controller 230 may transmit IP packet header and trailer stored or loaded in the packet memory 234 based on the location information of the IP packet header and trailer. It is noted that in this embodiment, the memory controller 230 is a component of the tool engine FPGA 218, while the packet memory 234 may be external to the tool engine FPGA 218. It is further noted that the test traffic generator (e.g., the packet generator 228) is an interface between the memory controller 230 and the user logic pre-configured in the tool engine FPGA 218, which defines how data packets 240 are supposed to be exchanged between the packet memory management unit and the one or more crossbar units 238 residing within the tool engine 218.

According to an embodiment of the present invention, the memory controller 230 may be configured to selectively generate packet delay and the packet memory 234 can be utilized as a delay memory. In this embodiment, packet delay may be achieved by writing received port data to the packet memory 234 and then after a certain amount of memory is written, start retrieving the packet data from the packet memory 234 and transmitting it to the destination requiring delay. Once an input port is enabled for delay, all data 240 received from a port, such as data packets and idle characters between packets, are written to the delay memory (i.e., packet memory 234). It should be noted that the amount of memory loaded before initiating retrieval may be preconfigured by a user. Full packet delay may be achieved by the memory controller 230 by loading the entire packet memory 234, so that it can be read out immediately thereafter.

The intelligent physical layer switch device 200 for monitoring test network described above not only provides programmable connectivity to the test network 101 that can be configured remotely from a software client 242 communicatively coupled to the intelligent physical layer switch device 200, for example via a wireless link 244, but also provides the novel capability to remotely load different integrated configurations of test tools and test hardware as desired. In various embodiments, all configuration metadata, artifacts and files can be associated with a performance test of the network 101 and be recorded to support later reruns with high repeatability of exact configuration. Such configuration data includes not just configuration of every component and every test tool in the framework 200, but also the context in which the results are produced, which can be drilled down later to exact configuration data if so desired. In addition, all log files associated with the configuration and test can be saved for later analysis if desired. Here, there is no distinction between the configuration of the framework and test script variation. Overall, there can be hundreds of configuration properties which can be used during automated configuration and there can be several thousand contextual configuration properties which are being recorded (artifacts of the system configuration). Such contextual properties include but are not limited to, all possible test tools (e.g., packet data generating tool) files used in the test, proxy configuration files used during test, etc. In other words, the intelligent physical layer switch device 200 can record as many contextual configuration metadata as are available, some of which cannot currently be configured automatically.

According to an embodiment of the present invention, in contrast to conventional methodology, rather than deploying multiple standalone hardware and/or software test tool systems, the test tool engine 218 and one or more control applications executable by the embedded controller 210 can be updated with configuration images of software modules customized for the desired test application. Advantageously, a plurality of configuration images of integrated configurations can be stored in the FPGA image storage 232 on the intelligent physical layer switch device 200 for later deployment and can be remotely loaded on demand by a test engineer, for example, via the software client device 242. As used herein, the term "configuration image," is used to describe the binary data that constitutes a particular integrated configuration, including contextual configuration metadata, corresponding to a particular test suite. The size of the images can be on the order of multiple gigabytes and, therefore, can occupy a significant amount of storage. The configuration images can be backed up, periodically or on command, in the FPGA image storage 232 or on a separate backup device. When a user (tester) identifies a desirable set (suite) of tests to be performed on one of the software client devices 242, the embedded controller 210 retrieves the corresponding configuration image from the FPGA image storage 232, and loads the retrieved configuration image on the test tool engine 218, for example. From the user's point of view, the automatically loaded configuration image functions as a newly configured set of test tools and is substantially indistinguishable from manually configured test infrastructure. Test results may be used to diagnose network anomalies and to compare performance or other characteristics of various network configurations.

As yet another advantage, in one embodiment, the network testing system may be implemented using a blade server architecture, which may include one or more multi-switch chassis. As used herein, the term "multi-switch chassis" refers to a switch architecture that includes a chassis, backplane, and various other circuitries (e.g., power supply, a centralized chassis controller, or the like) for enabling use of a plurality of intelligent physical layer switches. In other words, the network testing system may include a number of modular components, referred to as "chassis devices" herein, such as the intelligent physical layer switch device 200. In this example multiple chassis devices may be connected to one another, such as through backplane interfaces 208a, 208b, to form a single virtual network test device (e.g., an intelligent physical layer switch device). In one particular implementation, various components of the intelligent physical layer switch device 200 may be selectively distributed among the one or more chassis. As a non-limiting example, one of the chassis devices may serve as a centralized controller. This provides additional flexibility and a high degree of scalability because a plurality of the chassis devices, each device containing at least some components of the intelligent physical layer switch devices 200 described above and shown in FIG. 2, can be deployed and interconnected via the backplane interfaces 208.

Figure 3:
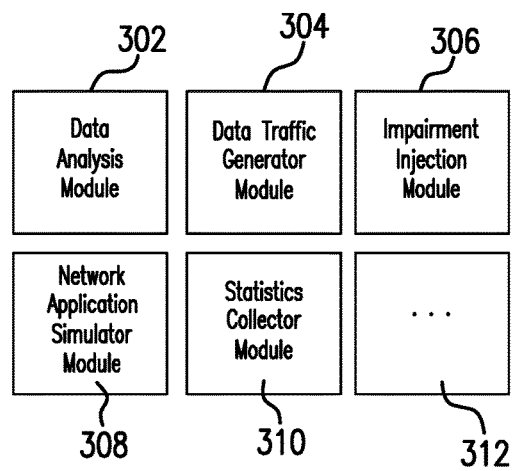
FIG. 3 is a block diagram of exemplary loadable test modules customized for a desired test application, according to an embodiment of the present invention.

FIG. 3 is a block diagram of exemplary loadable test modules customized for a desired test application, according to an embodiment of the present invention. As described above, various embodiments of the present invention provide an ability to load into the test tool engine 218 various pre-configured test functions remotely, on the fly, thus simplifying the test automation infrastructure considerably, while also greatly increasing its scalability. As shown in FIG. 2, the embedded controller 210 is connected to one or more test tool engines 218 and the embedded controller 210 has a computer readable medium, such as, but not limited to, the CPU memory 216. In one embodiment, exemplary loadable test modules may include, a data analysis module 302, a data traffic generator module 304, an impairment injection module 306, a network application simulator module 308 and a statistics collector module 310, all of which cooperate with each other to perform various tests.

In an embodiment, the analysis module 302 may further comprise sub-modules, such as, for example, a compliance module, a context analysis module and a content analysis module. The compliance module may include an Application Programming Interface (API) that permits a user to communicate a user-specified pre-configured policy to the analysis module 302. The policy can include context data comprising a set of context criteria used by the context analysis module and can include content data comprising a set of content criteria used by the content analysis module. As discussed herein, context criteria can include directionality of a network flow (e.g., whether incoming to or outgoing from the network 101), date or time information, or any type of metadata associated with a network flow. Also as discussed herein, the content criteria can include criteria used to identify confidential information in a data transmission, regular expressions for matching patterns of characters, numbers, symbols, etc. in a data transmission, source and/or destination IP address or port, and so forth. In one embodiment, the data analysis module 302 of the switch 200 may compare the test packets generated by the data traffic generator 304 described below with packet trace information contained in one or more log files to determine if the network 101 performed consistently with the applicable protocols and performance requirements.

The data traffic generator module 304 is used in the intelligent physical layer switch device 200 to produce and transmit one or more simulated pseudo-traffic flows to the network 101. It is noted that the physical layer switch device 200 may be connected to the network 101 so as to form one or more transmission loops. In other words, the intelligent switch device 200 may receive the pseudo-traffic back from the network 101 for purposes of monitoring the network's ability to properly classify, buffer, and forward data traffic under conditions that model real-world demands. In accordance with the preferred embodiment, the disclosed intelligent switch device 200 may be adapted to serve as a traffic generator at significantly reduced per-port cost compared to a dedicated traffic generator/monitor test tool. In particular, this stand-alone switch device 200 may be adapted to integrally incorporate the fast path traffic generator hardware module 228 with the data traffic generator software module 304 as well as other software modules 302, 306-310 discussed herein, thereby taking advantage of the high-speed processing resources of the switch 200 with minimal detrimental impact on the switching performance, if any.

In certain embodiments, the intelligent physical layer switch device 200 may additionally employ the impairment injection module 306 to inject impairments (or exceptions) into pseudo-network traffic generated by, for instance, the data traffic generator module 304. As noted above, the data traffic generator module 304 can randomly generate or specifically generate flows of information (i.e., traffic) and the impairment injection module 306 can randomly or specifically inject generated impairments, according to information from the test scripts executed by the embedded controller 210. In this manner, a flow of information may be predetermined or dynamically configured to corresponding to varying types or forms of "real-world" networking conditions, such as network traffic corresponding to data, voice, and/or video transport over one or more public and/or private networks, e.g., one or more LANs, MANs, WANs, etc.

The network application simulator module 308 may be adapted to simulate network application functionality. Results generated by the application simulator module 308 may be used to analyze the network performance impact due to various factors such as changes in system parameter settings, introduction of new service applications, and the like. For example, in one embodiment, a traffic flow produced by the traffic generator module 304 may be defined by the application simulator module 308 as a source with transmission requirements associated with an application such as video-telephony, VoIP, etc. In other words, results generated by the application simulator module 308 may help to emulate end-to-end network communications.

According to an embodiment of the present invention, when the switch 200 operates in either "smart" mode or "stats" mode, the statistics collector 222 may be enabled to provide statistics on one or more group of ports designated as monitoring ports. In this embodiment, the statistics collector software module 310 may be adapted to control the logic of the pre-configured statistics collector component 222. As noted above, various individual groups of ports may have different sampling periods.

Thus, various configurable software modules 302-312 loaded onto the intelligent physical layer switch device 200, in cooperation with each other, may stress the network 101 under various conditions and testing scenarios. One aspect of the various embodiments is to produce complete "end to end" packet trace information along with user-defined performance metrics. Packet trace information may be used to reconstruct transmitted voice/video streams in order to examine the behavior of the network 101. Network performance can be evaluated so that impairments such as packet loss or erasure and delay jitter can be corrected, alternatively processing and/or buffering strategies employed to mitigate their effect. Additional post processing elements can be added as other software modules 312 to further enhance the analysis capability.

Figure 4:
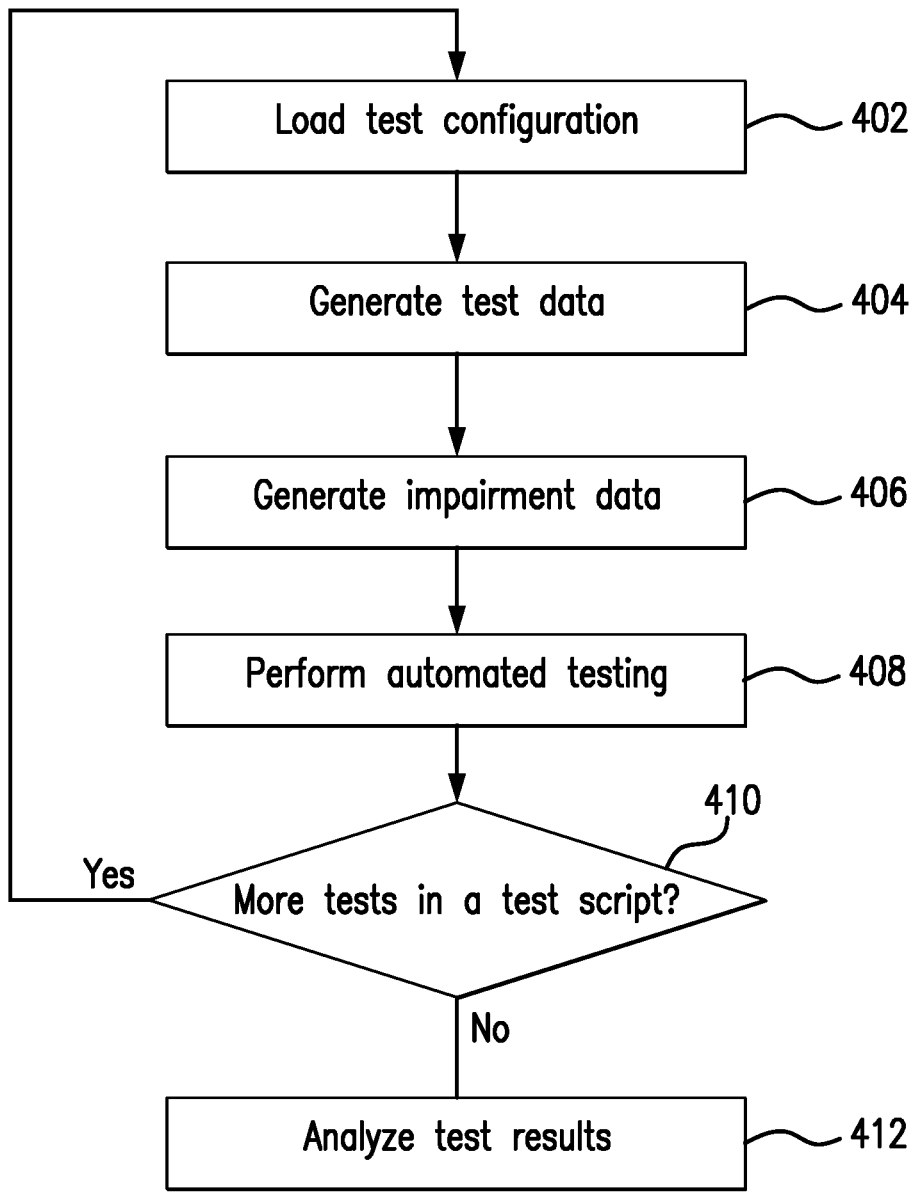
FIG. 4 is a flowchart of operational steps for automated network testing performed by the integrated network switch of FIG. 2, in accordance with an illustrative embodiment of the present invention.

FIG. 4 is a flowchart of operational steps for automated network testing performed by the integrated network switch of FIG. 2, in accordance with an illustrative embodiment of the present invention. Before turning to description of FIG. 4, it is noted that the flow diagram shown therein is described, by way of example, with reference to components shown in FIGS. 1-3, although these operational steps may be carried out in any system and are not limited to the scenario shown in the aforementioned figure. It should be appreciated that in some embodiments some of the steps described below may be combined into a single step. In some embodiments, one or more additional steps may be included.

Referring now to FIG. 4, at 402, the embedded controller 210 running one or more test control applications receives a request from the client device 242 operatively coupled to the integrated network switch 200 (as shown in FIG. 2). In an embodiment, the request received from the client device 242 specifies a particular test script to be executed by the embedded controller 210 and/or specifies criteria (i.e. specific configuration) for testing the network traffic flow activity data. In response to receiving the request, the embedded controller 210 may change to "smart" or "stats" mode of operations, if needed, search the FPGA image storage 232 to find a configuration image associated with the requested test script and/or to find an image that satisfies the requested test criteria. When the embedded controller 210 identifies a desirable set (suite) of tests to be performed, the embedded controller 210 retrieves the corresponding configuration image from the FPGA image storage 232, and loads the retrieved configuration image on the test tool engine 218, for example. In one embodiment, this image can include one or more of the configurable software modules 302-312 customized and configured for the desired test. From the user's point of view, the automatically loaded configuration image functions as a newly configured set of test tools and is substantially indistinguishable from manually configured test infrastructure.

Subsequently, at 404, the embedded controller 210 sends a request to the data traffic generator module 304 to either randomly generate or specifically generate flows of information (i.e., traffic) based on the test script being executed.

In one embodiment, the data traffic generator module 304 utilizes the packet generator 228 pre-configured for a specific set of tests, where the user first defines a template and a traffic pattern as one or several 'streams', specifying transmission and reception ports. In this embodiment, network data traffic generation performed by the data traffic generator module 304 may further involve specifying the streams to use, the maximum traffic rate, max number of iterations, duration of each iteration, and/or any other suitable test criteria associated with the generated traffic.

Next, at step 406, the embedded controller 210 may optionally send a request to the impairment injection module 306 to generate specific impairments and network errors based on the test script being executed. At least some of these impairments may simulate network conditions such as, but not limited to, packet loss and packet delay, as described above.

According to an embodiment of the present invention, at 408, the embedded controller 210 executes routing of the generated network data and/or impairments data using the one or more transmission ports specified in the test template by sending corresponding control data. This step may further involve emulation of network application functionality provided, for example, by the preconfigured network application simulator module 308. Thus, in this embodiment, the intelligent physical layer switch device 200 combines event information from a variety of integrated test tools for routing test data to the network 101 based on the specified test criteria (i.e., specific network conditions).

Once a particular test is executed, at 410, the embedded controller 210 determines whether the test script being executed includes additional tests. In response to determining that the test script contains additional tests (decision block 410, "yes" branch), the embedded controller 210 may determine if a different configuration image, such as an image containing a different software module, needs to be retrieved from the FPGA image storage 232 and may repeat the above-described steps 402-408 for the next test to be executed. On the other hand, in response to determining that all tests contained within the test script have been completed (decision block 410, "No" branch), at 412, the embedded controller 210 may send a request to the statistics collector module 310 to provide a subset of the collected statics to the data analysis module 302, for example. In one embodiment, the data analysis module 302 of the switch 200 may compare the test packets generated by the data traffic generator 304 with corresponding packet traces for each specific test scenario to determine if the network 101 performed consistently with the applicable protocols and performance requirements.

In summary, various embodiments of the present invention disclose the intelligent physical layer switch device 200 connected to the network 101 via the high speed automated interconnection link 119 shown in FIG. 1. Advantageously, the disclosed device can effectively test the performance of the network, fully utilizes hardware resources, is high in test efficiency, can save manpower resources, can lower test cost and improves the testing accuracy and precision of various network test tools integrated therein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An automated network test system comprising:
    an integrated network switch connected to a network under test, the network switch comprising:
    a first and second plurality of network switch ports;
    a physical layer engine coupled to the first plurality of network switch ports;
    at least one processor having a plurality of processing cores that can each asynchronously execute a test execution context; and
    a test engine having a dynamically configurable impairment injection module, the test engine coupled to the second plurality of network switch ports, the physical layer engine and the at least one processor, the test engine configured for automatic testing of the network under test.

2. The automated network test system as recited in claim 1, wherein the plurality of dynamically configurable function modules comprises a field programmable gate array (FPGA).

3. The automated network test system as recited in claim 2, wherein the test engine further includes dynamically configurable function modules consisting of: a data analysis module, a data traffic generator module, a network application simulator module and a statistics collector module.

4. The automated network test system as recited in claim 1, wherein at least one of the plurality of processing cores comprises an embedded processor core for executing program instructions associated with one or more test control applications, the embedded processor core coupled to a CPU bus interconnecting the embedded processor with the test engine.

5. The automated network test system as recited in claim 1, wherein at least one of the plurality of processing cores comprises an embedded processor core for executing program instructions associated with packet processing, the packet processing core configured for sending and receiving control data to/from the test engine.

6. The automated network test system as recited in claim 1, further comprising image storage coupled to the test engine for storing a plurality of configuration images, wherein each of the plurality of configuration images comprises a plurality of test tools configuration settings corresponding to a particular test.

7. The automated network test system as recited in claim 6, further comprising a remote application hosted by an external device operatively coupled to the integrated network switch, wherein the remote application enables a user to specify one or more test tool configurations to be loaded into the integrated network switch and wherein the remote application enables a user to specify one or more test suites to be executed by the integrated network switch.

8. The automated network test system as recited in claim 7, wherein the at least one processor is further configured to retrieve from the image storage the one or more test tool configurations specified by the user and further configured to load the one or more test tool configurations into the test engine of the integrated network switch.

9. The automated network test system as recited in claim 5, further comprising packet memory coupled to the test engine for storing packets to be used for the automatic testing of the network under test and to be used for subsequent packet analysis.

10. The automated network test system as recited in claim 9, wherein the test engine further comprises:
    a parser coupled to the second plurality of network switch ports;
    a crossbar switch interconnect fabric coupled to the parser and to at least one of the plurality of processing cores, the crossbar switch fabric portion including a control module configured to receive the control data from the at least one of the plurality of processing cores and configured to generate traffic data based on the received control data;
    a fast-path packet data driver coupled to the crossbar switch interconnect fabric, the fast-path packet data driver configured to receive and process the generated traffic data; and
    one or more memory controllers configured to manage traffic data determined to be stored to the packet memory by the fast-path packet data driver.

* * * * *